(12) United States Patent
Servais et al.

(10) Patent No.: US 10,927,030 B2
(45) Date of Patent: Feb. 23, 2021

(54) GLASS PRODUCT ANNEALING LEHR WITH TEMPERATURE CONTROL SYSTEM

(71) Applicant: Robex, LLC, Perrysburg, OH (US)

(72) Inventors: James R. Servais, Maumee, OH (US); Robert Holmes, Dunbar, PA (US)

(*) Notice: Subject to any disclaimer, the term of this patent is extended or adjusted under 35 U.S.C. 154(b) by 229 days.

(21) Appl. No.: 15/994,301

(22) Filed: May 31, 2018

(65) Prior Publication Data
US 2018/0346367 A1    Dec. 6, 2018

Related U.S. Application Data

(60) Provisional application No. 62/512,760, filed on May 31, 2017.

(51) Int. Cl.
  *C03B 25/02*    (2006.01)

(52) U.S. Cl.
  CPC .................................. *C03B 25/02* (2013.01)

(58) Field of Classification Search
  CPC ......... C03B 25/00; C03B 25/02; C03B 25/04; C03B 25/06
  See application file for complete search history.

(56) References Cited

U.S. PATENT DOCUMENTS

| | | |
|---|---|---|
| 3,047,417 A | 7/1962 | Melrose |
| 3,416,908 A | 12/1968 | Goodwin et al. |
| 3,860,407 A | 1/1975 | Fertik |
| 3,903,768 A | 9/1975 | Amberg et al. |
| 3,963,469 A | 6/1976 | Pierre |
| 4,043,780 A * | 8/1977 | Bricker .................. C03B 25/08  65/29.19 |

(Continued)

FOREIGN PATENT DOCUMENTS

CN    204752521 U    * 11/2015

OTHER PUBLICATIONS

Machine translation of CN 204752521, Glass annealing furnace cooling energy-saving device has infrared thermometer that obtains and transmits glass bottle temperature to temperature control unit to adjust frequency converter to control wind speed of exhaust fan and blower, Nov. 11, 2015 (Year: 2015).*

(Continued)

*Primary Examiner* — Queenie S Dehghan
(74) *Attorney, Agent, or Firm* — Charles F. Charpie, III

(57) ABSTRACT

A temperature control system fitted to a system for forming glass product is provided. The temperature control system includes a first plurality of temperature sensors configured to sense a temperature of glass products exiting an annealing lehr. The first plurality of temperature sensors is further configured to generate sensed temperature signals. A second plurality of temperature sensors configured to sense a temperature of glass products exiting a cooling fan bank. The cooling fan bank is positioned downstream from the annealing lehr. The second plurality of temperature sensors is further configured to generate sensed temperature signals. A control module is configured to receive the sensed temperature signals from the first and second plurality of temperature sensors and compare the sensed temperature signals with pre-set parameters. The control module is configured to direct adjustments in a rotational speed of a plurality of cooling fans in response to the sensed temperature signals.

12 Claims, 8 Drawing Sheets

(56) References Cited

U.S. PATENT DOCUMENTS

| | | | |
|---|---|---|---|
| 4,072,492 A | | 2/1978 | Castine, Jr. |
| 4,162,911 A | | 7/1979 | Mallory |
| 4,481,025 A | | 11/1984 | Rodriguez et al. |
| 4,793,465 A | | 12/1988 | DiFrank |
| 5,700,306 A | | 12/1997 | Maltby, Jr. et al. |
| 5,950,799 A | | 9/1999 | Peltier et al. |
| 6,508,303 B1 | * | 1/2003 | Naderer .................. F24F 11/77 165/299 |
| 6,705,122 B2 | | 3/2004 | Mace |
| 2009/0172591 A1 | * | 7/2009 | Pomper ................ G06F 3/0482 715/810 |
| 2012/0226378 A1 | * | 9/2012 | Simon ...................... C03B 9/41 700/157 |
| 2017/0066678 A1 | * | 3/2017 | Zhao .................. C03B 27/0417 |
| 2017/0217822 A1 | * | 8/2017 | Imase ................ C03B 37/0253 |

OTHER PUBLICATIONS

Brochure for Ircon Modline 4 Infrared Thermometers, 2009 (Year: 2009).*

* cited by examiner

GLASS PRODUCT ANNEALING LEHR WITH TEMPERATURE CONTROL SYSTEM

RELATED APPLICATIONS

This application claims the benefit of U.S. Provisional Application No. 62/512,760, filed May 31, 2017, the disclosure of which is incorporated herein by reference in its entirety.

BACKGROUND

In the production of glass products, such as for example, containers, bottles, jars and the like, molten glass in the form of gobs is fed to forming sections where the glass products are shaped.

The glass products formed by the forming sections, while still hot, are deposited on a conveyor which move the glass products away from the forming sections. The glass products are then deposited on a lineal conveyor of an annealing lehr, wherein they are exposed to a tempering process which eliminates the residual stresses accumulated in the glass due to fast cooling during the forming process.

As the glass products exit the annealing lehr, they can be sprayed with lubricants configured to help prevent downstream breakage as the glass products come into contact with each other. An effective application of the lubricant requires the glass products to be in a certain temperature range. If the glass products are too hot, the lubricant can evaporate. If the glass products are too cool, then the lubricant tends to form undesirable spots on the outer surface of the glass products. In either case, the resulting glass products may be unsuitable for use.

It would be advantageous if the temperature of the glass products could be better controlled resulting in a more effective application of the lubricant as the glass products exit the annealing lehr.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the glass product annealing lehr with temperature control system.

The above objects as well as other objects not specifically enumerated are achieved by a temperature control system fitted to a system for forming glass product. The temperature control system includes a first plurality of temperature sensors configured to sense a temperature of an outer surface of glass products exiting an annealing lehr. The first plurality of temperature sensors is further configured to generate sensed temperature signals. A second plurality of temperature sensors configured to sense a temperature of an outer surface of glass products exiting a cooling fan bank. The cooling fan bank is positioned downstream from the annealing lehr. The second plurality of temperature sensors is further configured to generate sensed temperature signals. A control module is in electrical communication with the first plurality of temperature sensors and the second plurality of temperature sensors. The control module is configured to receive the sensed temperature signals from the first and second plurality of temperature sensors and compare the sensed temperature signals with pre-set parameters. The control module is further configured to direct adjustments in a rotational speed of a plurality of cooling fans in the cooling fan bank in response to the sensed temperature signals.

The above objects as well as other objects not specifically enumerated are also achieved by a method of using a temperature control system fitted to a system for forming glass product. The method includes the steps of sensing a temperature of an outer surface of glass products exiting an annealing lehr with a first plurality of temperature sensors, the first plurality of temperature sensors further configured to generate sensed temperature signals, sensing a temperature of an outer surface of glass products exiting a cooling fan bank with a second plurality of temperature sensors, the second plurality of temperature sensors further configured to generate sensed temperature signals, receiving the sensed temperature signals in a control module, comparing the sensed temperature signals with pre-set parameters and directing adjustments in a rotational speed of a plurality of cooling fans in the cooling fan bank in response to the sensed temperature signals.

Various objects and advantages of the glass product annealing lehr with temperature control system will become apparent to those skilled in the art from the following Detailed Description, when read in light of the accompanying drawings.

DETAILED DESCRIPTION

Figure 1:
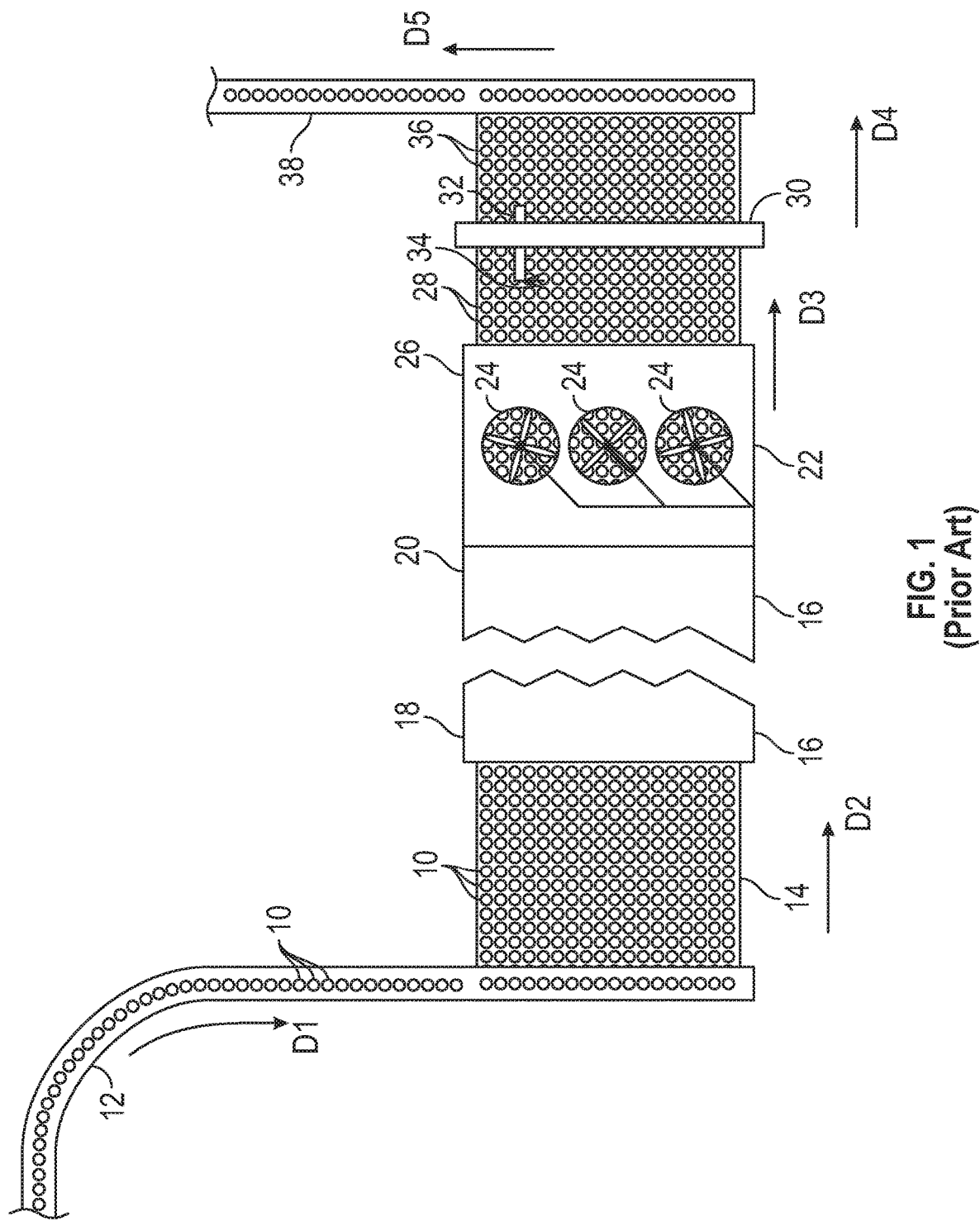
FIG. 1 is a plan view of a conventional annealing lehr cooling system for glass products.

The glass product annealing lehr with temperature control system (hereafter "temperature control system") will now be described with occasional reference to specific embodiments. The temperature control system may, however, be embodied in different forms and should not be construed as limited to the embodiments set forth herein. Rather, these embodiments are provided so that this disclosure will be thorough and complete, and will fully convey the scope of the temperature control system to those skilled in the art.

Unless otherwise defined, all technical and scientific terms used herein have the same meaning as commonly understood by one of ordinary skill in the art to which the temperature control system belongs. The terminology used in the description of the temperature control system herein is for describing particular embodiments only and is not intended to be limiting of the temperature control system. As used in the description of the temperature control system and the appended claims, the singular forms "a," "an," and "the"

are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the temperature control system. Notwithstanding that the numerical ranges and parameters setting forth the broad scope of the temperature control system are approximations, the numerical values set forth in the specific examples are reported as precisely as possible. Any numerical values, however, inherently contain certain errors necessarily resulting from error found in their respective measurements.

In accordance with the illustrated embodiments, a temperature control system for use with glass products exiting an annealing lehr is provided. Generally, the temperature control system is configured to sense the temperature of glass products at different positions in the process. First, the temperature control system is configured to sense the temperature of glass products exiting a lehr, prior to cooling and prior to application of lubricants to an outer surface of the glass products. Second, the temperature control system is also configured to sense the temperature of the glass products after the glass products have passed through a plurality of cooling fans and prior to the application of the lubricant to the outer surface of the glass product. The temperature control system is further configured to adjust the rotational speed of the plurality of cooling fans positioned downstream from the annealing lehr in a manner such as to adjust the temperature of the glass product. In this manner, the temperature control system is used to cool the glass product to a temperature suitable for effective application of the lubricant.

Referring now to the drawings, there is illustrated in FIG. 1 a schematic illustration of a portion of a system for forming glass product. The system is conventional in the art and will only be briefly described herein. It should be appreciated that the glass product can have different forms, such as the non-limiting examples of containers, bottles, jars and the like. After the forming process, the still-hot glass products 10 are conveyed in a downstream direction, as indicated by direction arrow D1, by a conveyor system 12 and deposited onto an annealing lehr conveyor system 14. The conveyor systems 12, 14 are conventional in the art and will not be described herein. As the still-hot glass products 10 are deposited on the annealing lehr conveyor system 14, the still-hot glass products 10 are formed into rows and columns. Any suitable configuration of rows and columns can be used.

Referring again to FIG. 1, the still-hot glass products 10 are advanced by the annealing lehr conveyor system 14 into the annealing lehr 16, as indicated by direction arrow D2. As is conventional in the art, the annealing lehr 16 is a temperature-controlled kiln configured for annealing the still-hot glass product 10. In the illustrated embodiment, the annealing lehr 16 has the form of a long kiln within which a decreasing-temperature gradient is formed from a first end 18 to a second end 20, and through which the glass products 10 are transported by the annealing lehr conveyor system 14. However, in other embodiments, the annealing lehr 16 can have other forms.

Referring again to FIG. 1, a fan bank 22 is located proximate the second end 20 of the annealing lehr 16. The fan bank 22 includes a plurality of cooling fans 24, configured to generate and direct flows of cooling air over the glass product 10 as the glass product 10 exits the second end 20 of the annealing lehr 16, as indicated by direction arrow D3. As the glass product 10 leaves the fan bank 22 at a fan back exit 26, the glass product 10 has been cooled by the plurality of fans 24 to temperatures generally less than 300° F., thereby forming cooled glass product 28.

Referring again to FIG. 1, a lubrication system 30 is positioned in a downstream direction from the fan bank exit 26 and includes a plurality of lubricant spray heads 32 (a lone lubricant spray head 32 is shown for purposes of clarity). The plurality of lubricant spray heads 32 is configured to apply a film of lubricant 34 to an outer surface of the cooled glass products 28 as the cooled glass products 28 is advanced by the annealing lehr conveyor system 14, as indicated by direction arrow D4. As is known in the art, the lubricant can be specific to the type and nature of the cooled glass product 28. The lubrication system 30 can employ any desired quantity of lubricant spray heads 32. As the cooled glass product 28 is sprayed with the lubricant, lubricated glass product 36 is formed. Typically, the lubricated glass product 36 is advanced to further downstream operations (not shown) by a conveyor system 38, as shown by direction arrow D5.

Figure 2:
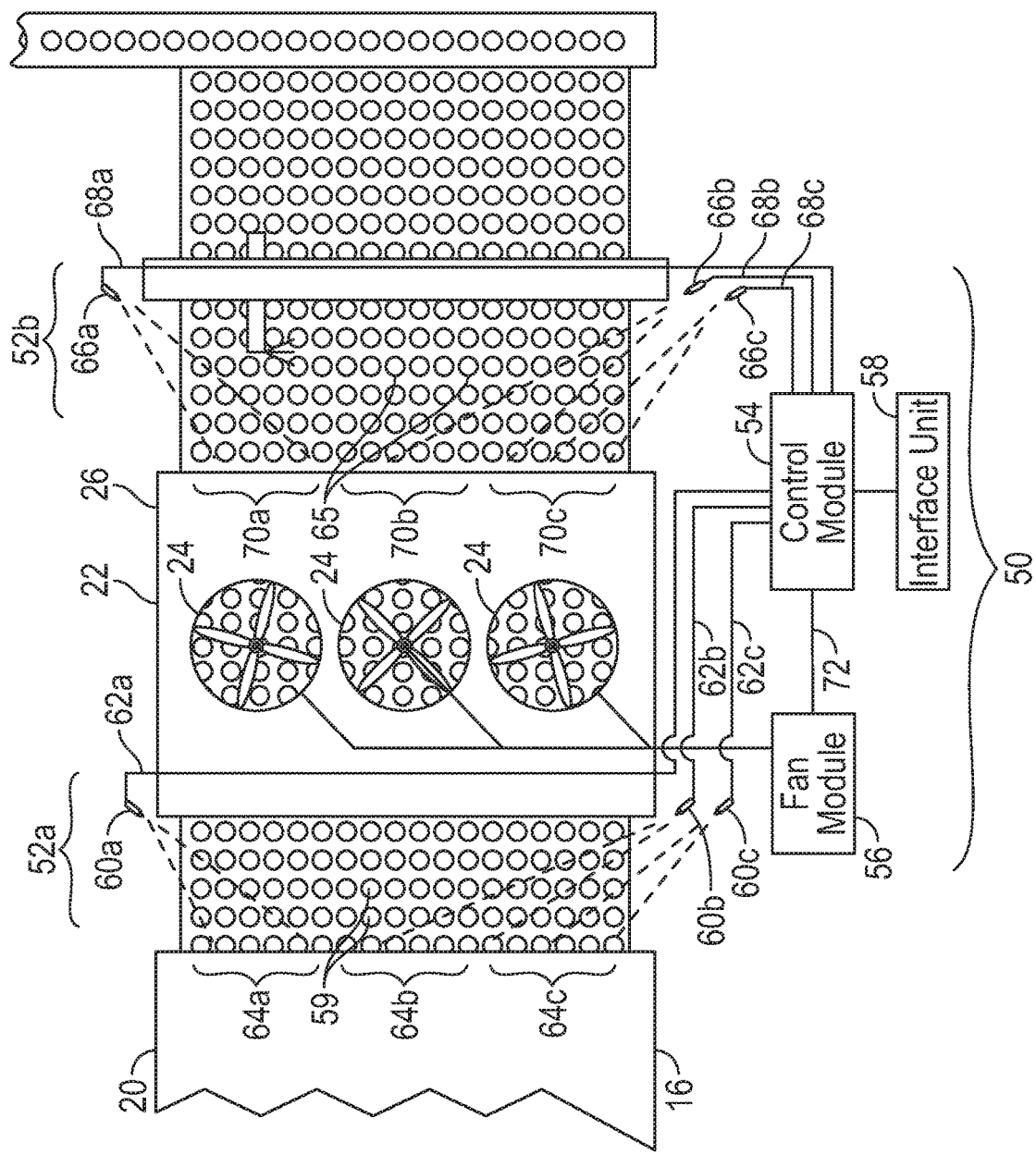
FIG. 2 is an enlarged plan view of a portion of the lehr cooling system of FIG. 1, shown equipped with a temperature control system.

Referring now to FIG. 2, a temperature control system 50 is disposed downstream from the annealing lehr 16 described above and shown in FIG. 1. The temperature control system 50 includes a pre-fan bank temperature sensing system 52a, a post-fan bank temperature sensing system 52b, a control module 54, a fan module 56 and an interface unit 58.

Referring again to FIG. 2, the pre-fan bank temperature sensing system 52a is configured to sense the temperature of the outer surfaces of the glass products 59 as the glass products 59 exit the second end 20 of the annealing lehr 16 and move downstream toward the fan bank 22. The pre-fan bank temperature sensing system 52a is configured to provide real-time temperature information to the control module 52. The pre-fan bank temperature sensing system 52a includes a plurality of pre-fan bank temperature sensors 60a-60c and a plurality of electrical connectors 62a-62c.

Referring again to FIG. 2, the pre-fan bank temperature sensor 60a is configured to sense the temperatures of pre-cooled glass products 59 in a first pre-fan bank zone 64a, the pre-fan bank temperature sensor 60b is configured to sense the temperature of the pre-cooled glass products 59 in a second pre-fan bank zone 64b and the pre-fan bank temperature sensor 60c is configured to sense the temperature of the pre-cooled glass products 59 in a third pre-fan bank zone 64c. Advantageously, the measurement of the temperatures of the pre-cooled glass products 59 in a plurality of pre-fan bank zones 64a-64c provides real-time temperature measurement over a majority of the pre-cooled glass products 59 exiting the second end 20 of the annealing lehr 16. While the embodiment illustrated in FIG. 2 shows a quantity of three pre-fan bank temperature sensors 60a-60c and a quantity of three pre-fan bank zones 64a-64c, it should be appreciated that in other embodiments, a quantity of more or less than three pre-fan bank temperature sensors and/or a quantity of more or less than three pre-fan bank zones can be used, sufficient to sense the temperatures of the pre-cooled glass products 59 exiting the second end 20 of the annealing lehr 16.

Referring again to the embodiment illustrated in FIG. 2, each of the pre-fan bank temperature sensors 60a-60c is an infrared style of sensor configured to generate and provide 4.0-20.0 mA, 0-10 VDC signals to the control module 54. One non-limiting example of a suitable pre-fan bank temperature sensor 60a-60c is the Omega Infrared Temperature Transmitter, Model No. OS136-2-V2, marketed and manufactured by Omega Engineering, Inc., headquartered in Norwalk, Conn. However, in other embodiments, other sensors can be used sufficient to sense the temperatures of the pre-cooled glass products 59 exiting the second end 20 of the annealing lehr 16 and provide real-time temperature information to the control module 54.

Referring again to FIG. 2, the electrical connectors 62a-62c are configured to electrically connect the pre-fan bank temperature sensors 60a-60c to the control module 52. In the illustrated embodiment, each of the electrical connectors 62a-62c is an electrically conductive wire, such as the non-limiting example of a copper-based wire. However, in other embodiments, the electrical connectors 62a-62c can be formed of other materials and can have other configurations, sufficient to electrically connect the pre-fan bank temperature sensors 60a-60c to the control module 52. In still other embodiments, it is contemplated that the pre-fan bank temperature sensors 60a-60c can be configured to provide real-time temperature information to the control module 54 in a wireless arrangement.

Referring again to FIG. 2, the post-fan bank temperature sensing system 52b is configured to sense the temperature of the outer surface of cooled glass products 65 as the cooled glass products 65 are moved in a downstream direction past the fan bank exit 26. The post-fan bank temperature sensing system 52b is configured to provide real-time temperature information to the control module 52. The post-fan bank temperature sensing system 52b includes a plurality of post-fan bank temperature sensors 66a-66c and a plurality of electrical connectors 68a-68c.

Referring again to FIG. 2, the post-fan bank temperature sensor 66a is configured to sense the temperatures of the cooled glass products 65 in a first post-fan bank zone 70a, the post-fan bank temperature sensor 66b is configured to sense the temperature of the cooled glass products 65 in a second post-fan bank zone 70b and the post-fan bank temperature sensor 66c is configured to sense the temperature of the cooled glass products 65 in a third post-fan bank zone 70c. Advantageously, the measurement of the temperatures of the cooled glass products 65 in a plurality of post-fan bank zones 70a-70c provides real-time temperature measurement over a majority of the cooled glass products 65 exiting the fan bank 22. While the embodiment illustrated in FIG. 2 shows a quantity of three post-fan bank temperature sensors 66a-66c and a quantity of three post-fan bank zones 70a-70c, it should be appreciated that in other embodiments, a quantity of more or less than three post-fan bank temperature sensors and/or a quantity of more or less than three post-fan bank zones can be used, sufficient to sense the temperatures of the cooled glass products 65 exiting the fan bank 22.

Referring again to the embodiment illustrated in FIG. 2, each of the post-fan bank temperature sensors 66a-66c is an infrared style of sensor configured to generate and provide 4.0-20.0 mA, 0-10 VDC signals to the control module 54. One non-limiting example of a suitable post-fan bank temperature sensor 66a-66c is the Omega Infrared Temperature Transmitter, Model No. OS136-1-V2, marketed and manufactured by Omega Engineering, Inc., headquartered in Norwalk, Conn. However, in other embodiments, other sensors can be used sufficient to sense the temperatures of the cooled glass products 65 exiting the fan bank 22 and provide real-time temperature information to the control module 54.

Referring again to FIG. 2, the electrical connectors 68a-68c are configured to electrically connect the post-fan bank temperature sensors 66a-66c to the control module 52. In the illustrated embodiment, each of the electrical connectors 68a-68c is an electrically conductive wire, such as the non-limiting example of copper-based wire. However, in other embodiments, the electrical connectors 68a-68c can be formed of other materials and can have other configurations, sufficient to electrically connect the post-fan bank temperature sensors 66a-66c to the control module 52. In still other embodiments, it is contemplated that the post-fan bank temperature sensors 66a-66c can be configured to provide real-time temperature information to the control module 54 in a wireless arrangement.

Referring again to FIG. 2, the control module 52 is configured for several functions. First, the control module 52 is configured to receive the real-time temperature information conveyed from the pre-fan bank temperature sensors 60a-60c and the post-fan bank temperature sensors 66a-66c. Second, the control module 54 is configured to compare the pre-fan bank and post-fan bank temperature sensor data against pre-set operational parameters. Third, the control module 54 is configured to generate fan speed adjustment signals in the event the measured temperatures in the pre-fan bank zones 64a-64c and/or the post-fan bank zones 70a-70c are out of tolerance with the pre-set operational parameters. Fourth, the control module 54 is also configured to convey the fan speed adjustment signals to the fan module 56 via electrical connector 72. Fifth, the control module 54 is configured to store a desired amount of measured temperature data. Sixth, the control module 54 is configured to provide trend analysis of the measured temperature data. Finally, the control module 52 is configured to accept pre-set operational parameters as provided by an external input device.

Referring again to FIG. 2, the control module 54 has the form of a programmable logic computer (PLC). In the illustrated embodiment, the PLC is an Allen-Bradley® Programmable Logic Controller Systems model Micro 820, manufactured by Allen-Bradly®, headquartered in Milwaukee, Wis. However, in alternate embodiments, other PLCs can be used sufficient for the functions discussed above.

Referring again to FIG. 2, the control module 54 is configured to provide fan speed adjustment signals to the fan module 56. The fan module 56 is configured to receive the fan speed adjustment signals and incorporate the fan speed adjustment signals into a variable frequency drive (VFD) module. The VFD module is a type of adjustable-speed drive used in to control the AC motor speed and torque of the plurality of fans 22 by varying motor input frequency and voltage. In the illustrated embodiment, the VFD module 66 is an Allen-Bradley® Powerflex model 525, manufactured by Allen-Bradly®, headquartered in Milwaukee, Wis. However, in alternate embodiments, other VFD modules can be used sufficient to control the AC motor speed and torque of the fans 22 by varying motor input frequency and voltage.

Referring again to FIG. 2, the interface unit 58 is configured for several functions. First, the interface unit 58 is configured to display system operating parameters. Second, the interface unit 58 is configured to set-up system operating parameters and communicate the system operating parameters to the control module 54. Third, the interface unit 58 is configured to display historical temperature data. Fourth, the interface unit 58 is configured to display historical temperature trends. Finally, the interface unit 58 is configured to provide alarm notices in the event the actual temperature data is outside the tolerances of the pre-set temperature parameters.

Figure 3:
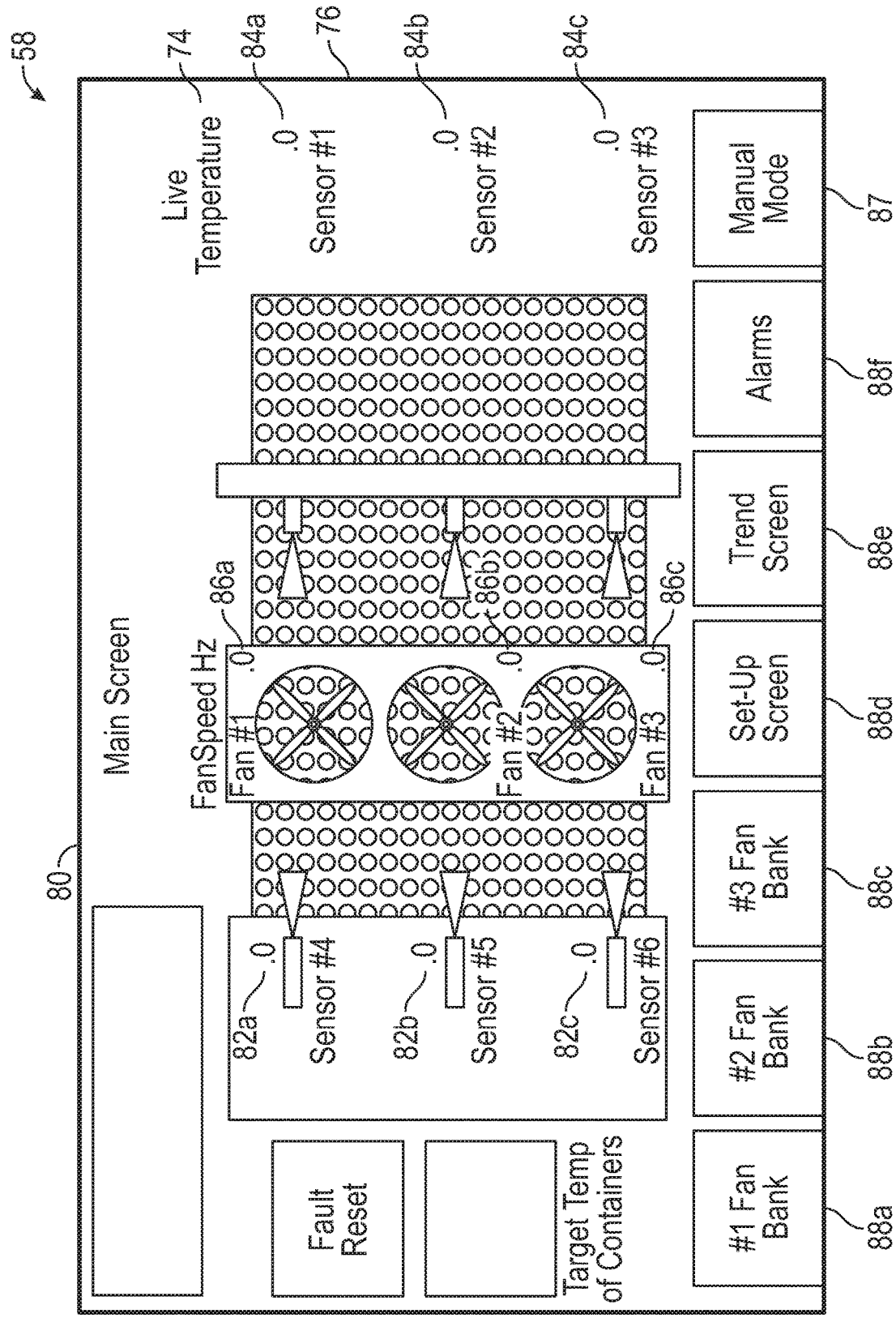
FIG. 3 is a schematic view of a first display of an interface unit of the temperature control system of FIG. 3.

Referring now to FIG. 3, the interface unit 58 includes a video-type display 74 and an input structure 76. In the illustrated embodiment, the video-type display includes a high-performance processor, high flash and dynamic memories enabling high-resolution displays. In the illustrated embodiment, the input structure 76 is a touch screen technology. In the illustrated embodiment, the interface unit 58 is an Allen-Bradley® Panel View Plus model 800, manufactured by Allen-Bradly®, headquartered in Milwaukee, Wis. However, in alternate embodiments, other interface units 58 can be used sufficient for the functions discussed above. While the input structure 76 is described above an embodying touch screen technology, it is contemplated the interface unit 58 can be enabled with other input technologies, such as the non-limiting example of a keyboard or key pad technology.

Referring again to FIG. 3, a first display 80 of the interface unit 58 is illustrated. The first display 80 includes data 82*a*-82*c* indicating real-time temperature values of pre-cooled glass products in the first, second and third pre-fan bank zones 64*a*-64*c* as measured by the pre-fan bank temperature sensors 60*a*-60*c*. The first display 80 also includes data 84*a*-84*c* indicating real-time temperature values of cooled glass products in the first, second and third post-fan bank zones 70*a*-70*c* as measured by the post-fan bank temperature sensors 66*a*-66*c*. The first display 80 further includes data 86*a*-86*c* indicating a command frequency for each of the fans 24 positioned in the fan bank 22. The command frequency is used to control the fan speeds of the fans 24.

Referring again to FIG. 3, the first display 80 includes an Auto/Manual 87 button and a plurality of navigation buttons 88*a*-88*f*, configured to provide user access to other displays. Referring first to the Auto/Manual button 87, in an auto setting, the speed of the fans 24 will be automatically adjusted to a target pre-set value. In a manual mode, the user defines a constant fan speed. The navigation buttons 88*a*-88*c* provides user access to specific fan banks. The navigation button 88*d* provides user access to a set-up screen, the navigation button 88*e* provides user access to trend screens and the navigation button 88*f* provides user access to alarm-related screens.

Figure 4:
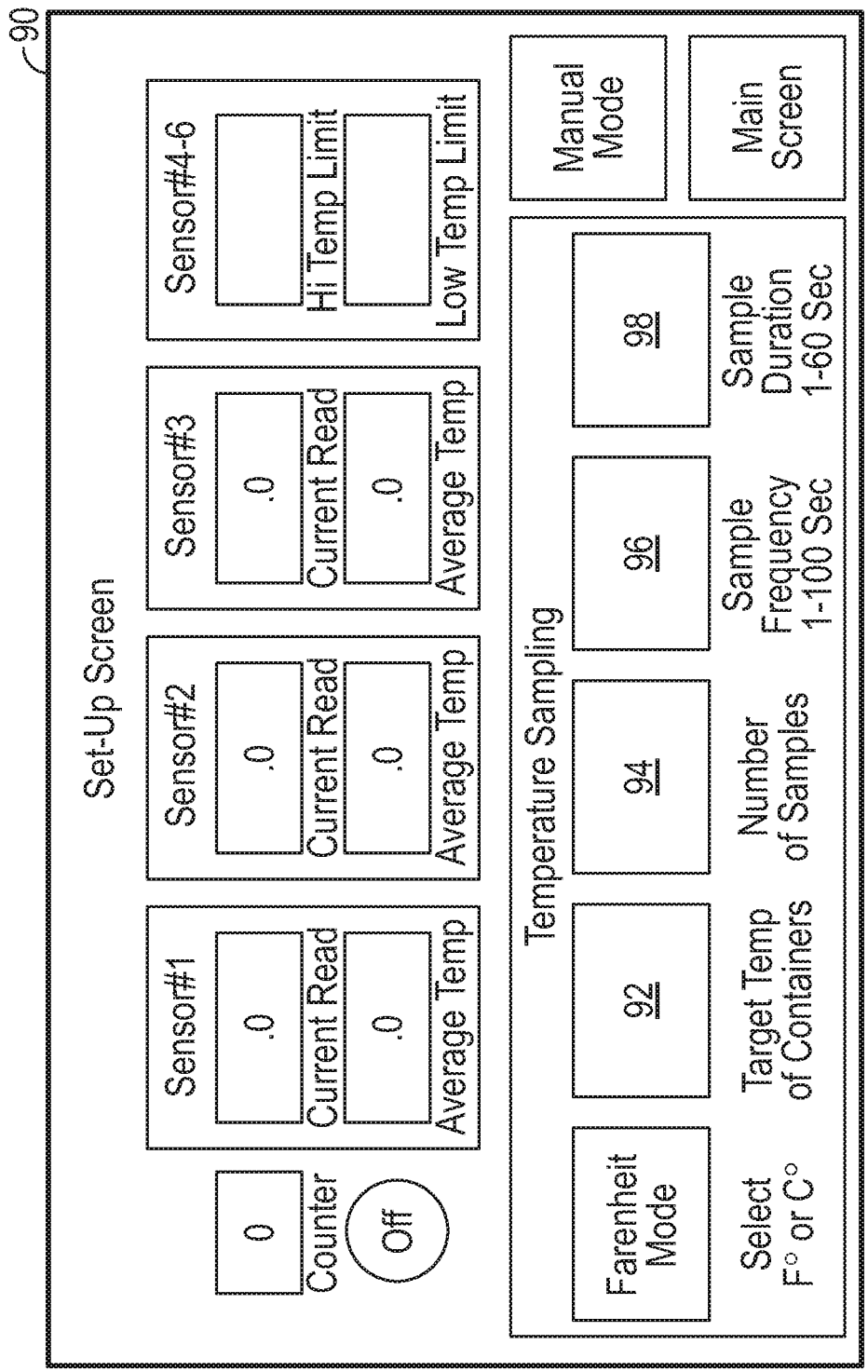
FIG. 4 is a schematic view of a second display of an interface unit of the temperature control system of FIG. 3.

Referring now to FIG. 4, a second display 90 of the interface unit 58 is illustrated. The second display 90 is configured to input set-up information for the temperature control system 50 including the desired glass product temperature, the adjustments for temperature examination and the frequency of the fan speed adjustments. The inputs of the second display 90 are loaded into the respective pre-fan bank zones 64*a*-64*c* or the post-fan bank zones 70*a*-70*c*.

Referring again to FIG. 4, a second display 90 of the interface unit 58 includes an target temperature input 92, configured as the target temperature setting for the pre-cooled glass product 59 in the pre-fan bank zones 64*a*-64*c* or for the cooled glass product 65 in post-fan bank zones 70*a*-70*c*. In the interface unit 58 is operating in the auto mode, then the control module 54 will attempt to maintain this pre-set temperature value.

Referring again to FIG. 4, a second display 90 of the interface unit 58 includes a batch counter pre-set 94, configured to determine how many temperature readings will be taken prior to adjusting the rotational speed of a fan. The second display 90 of the interface unit 58 includes a read cycle pre-set 96, configured to determine the frequency of the temperature readings (typically between 1-100 seconds). Finally, the second display 90 of the interface unit 58 includes a sample duration input 98, configured to determine the amount of time a temperature reading is displayed. It is noted that during a read cycle, the highest temperature value recorded is saved as the current temperature reading.

While the second display 90 of the interface unit 58 is described herein as showing the illustrated set-up information, it is within the contemplation of the temperature control system 50 that the second display 90 can include other set-up information.

Figure 5:
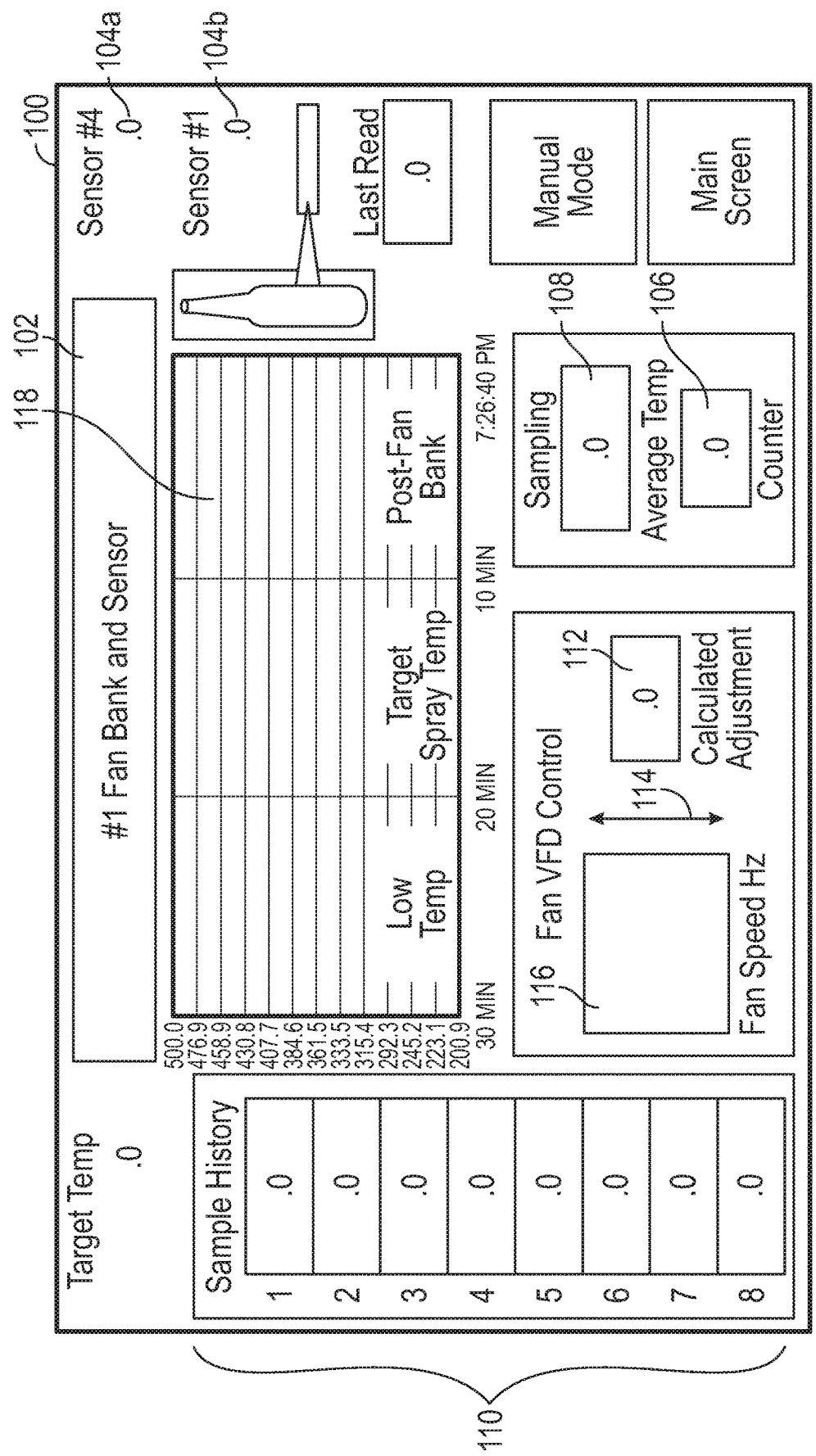
FIG. 5 is a schematic view of a third display of an interface unit of the temperature control system of FIG. 3.

Referring now to FIG. 5, a third display 100 of the interface unit 58 includes fan-specific setup data. The third display 100 includes a fan and sensor display 102 indicating the fan and sensor under consideration in the third display 100. The third display 100 also includes sensor readings 104*a*, 104*b*, configured to display the real-time temperature values of the indicated pre-fan bank temperature sensors 60*a*-60*c* and the post-fan bank temperature sensors 66*a*-66*c*.

Referring again to FIG. 5, a third display 100 includes a batch counter pre-set 106, configured to determine how many temperature readings will be taken prior to adjusting the rotational speed of a fan. The third display 100 also includes an average temperature display 108, configured to display the average temperature of the samples taken in the current batch. The third display 100 further includes a sample history 110, configured to display individual temperature readings for the current batch of temperature readings.

Referring again to FIG. 5, the third display 100 includes a speed change display 112, configured to display the amount of fan speed change (in hertz) that will take place during the next speed adjustment. The speed change display 112 also includes a direction indicator 114, indicating if the change in fan speed will be an increase or decrease. The third display 100 further includes a speed command display 116, configured to display the speed command that is being conveyed to the indicated fan. In certain embodiments, the operator can override the speed command by entering a new speed command Finally, the third display 100 includes a trend display 118. The trend display 118 will be discussed in more detail below.

Figure 6:
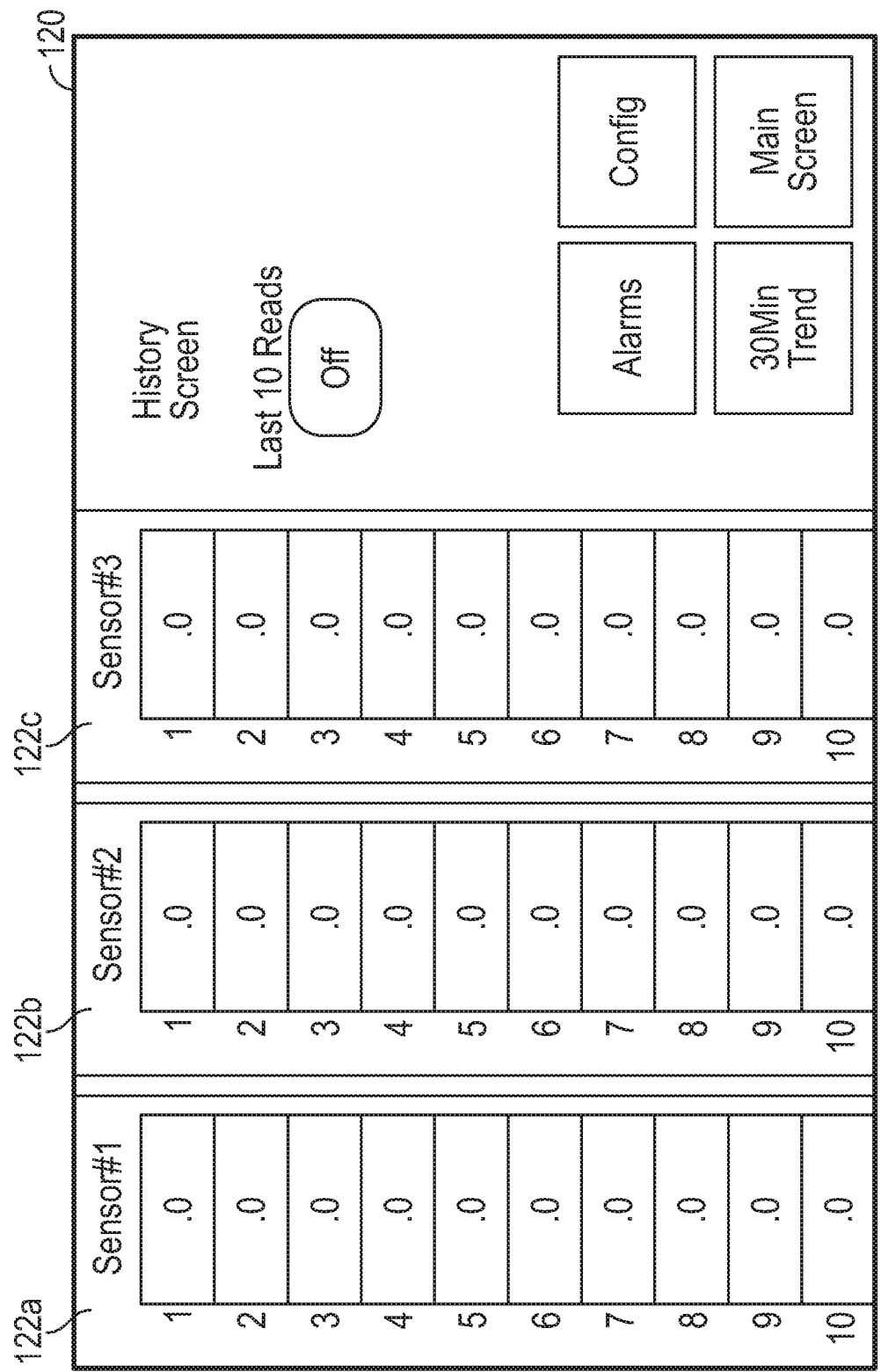
FIG. 6 is a schematic view of a fourth display of an interface unit of the temperature control system of FIG. 3.

Referring now to FIG. 6, a fourth display 120 provides a first sample history 122*a* for the first sensor 60*a*, a second sample history 122*b* for the second sensor 60*b* and a third sample history 122*c* for the third sensor 60*c*. While the embodiment shown in FIG. 6 provides a sample history for a quantity of three sensors 60*a*-60*c*, it should be appreciated that a sample history for more or less than three sensors can be shown. While the embodiment shown in FIG. 6 provides a sample history including a quantity of ten samples for each sensor, it should be appreciated that in other embodiments the sample history can include more or less than a quantity of ten samples for each sensor.

Figure 7:
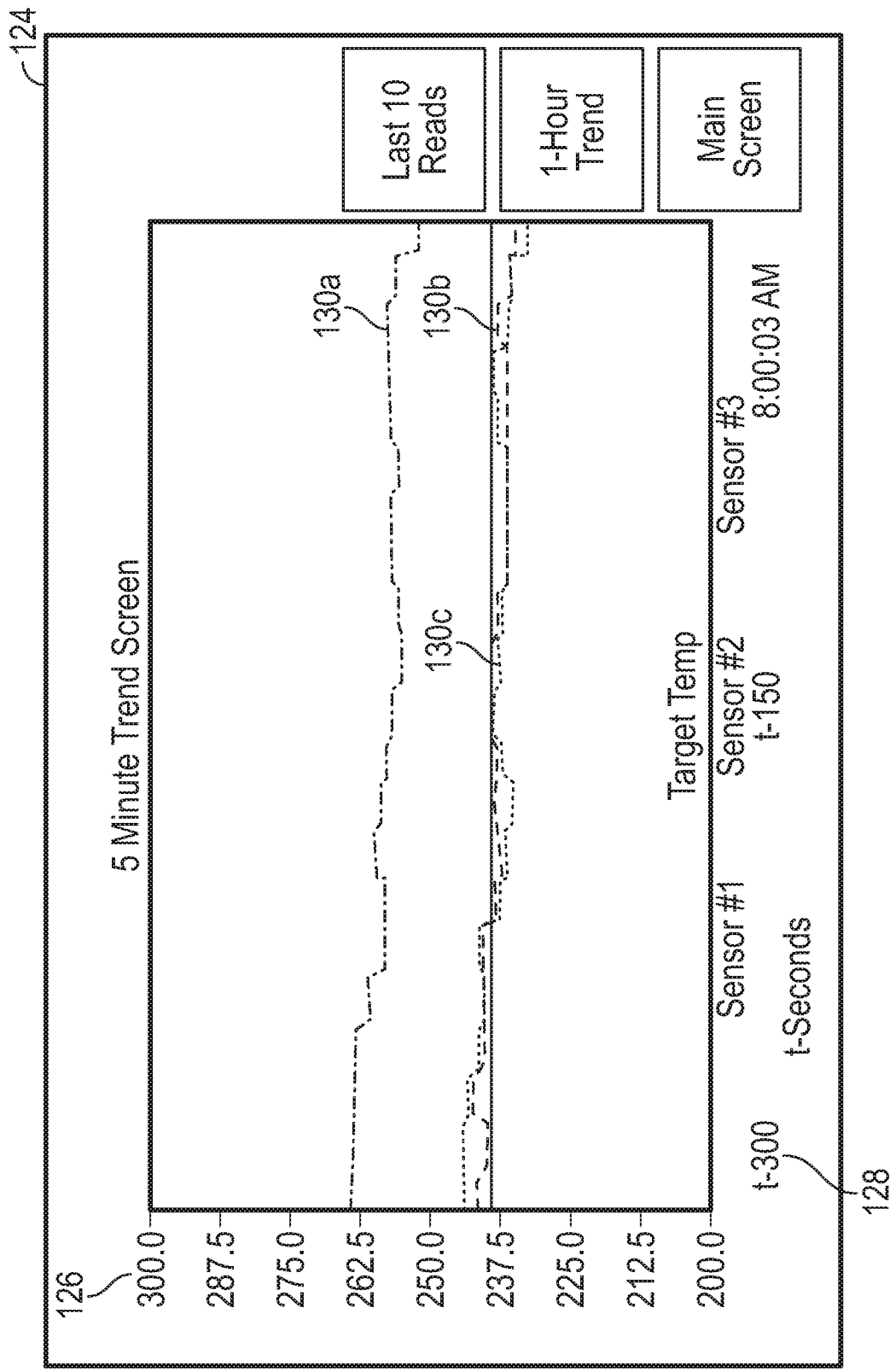
FIG. 7 is a schematic view of a line graph display of an interface unit of the temperature control system of FIG. 3.

Referring now to FIG. 7, the interface unit 58 can be configured to display trend data, as shown by line graph 124. The line graph 124 includes a vertical axis 126 showing temperature and a horizontal axis 128 showing time (in seconds). In the illustrated embodiment, the line graph 124 is a live view of temperature trend lines 130*a*-130*c* created from data received by the control module 54 from the various temperature sensors 60*a*-60*c* and/or 66*a*-66*c* over a five minute duration. In certain embodiments, the temperature trend lines 130*a*-130*c* can be different colors with each color representing a certain temperature range. As one non-limiting example, a red color line may represent a glass product 59, 65 having a temperature above a desired or pre-set parameter. While the embodiment of the line graph 124 illustrated in FIG. 7 shows a quantity of three temperature trend lines 130a-130c, it should be appreciated that in other embodiments, more or less than three trend lines can be illustrated. Further, it should be appreciated that while the data received by the control module 54 from the various temperature sensors 60a-60c and/or 66a-66c is illustrated in the form of trend lines, the data can be illustrated in other forms and for other durations.

Figure 8:
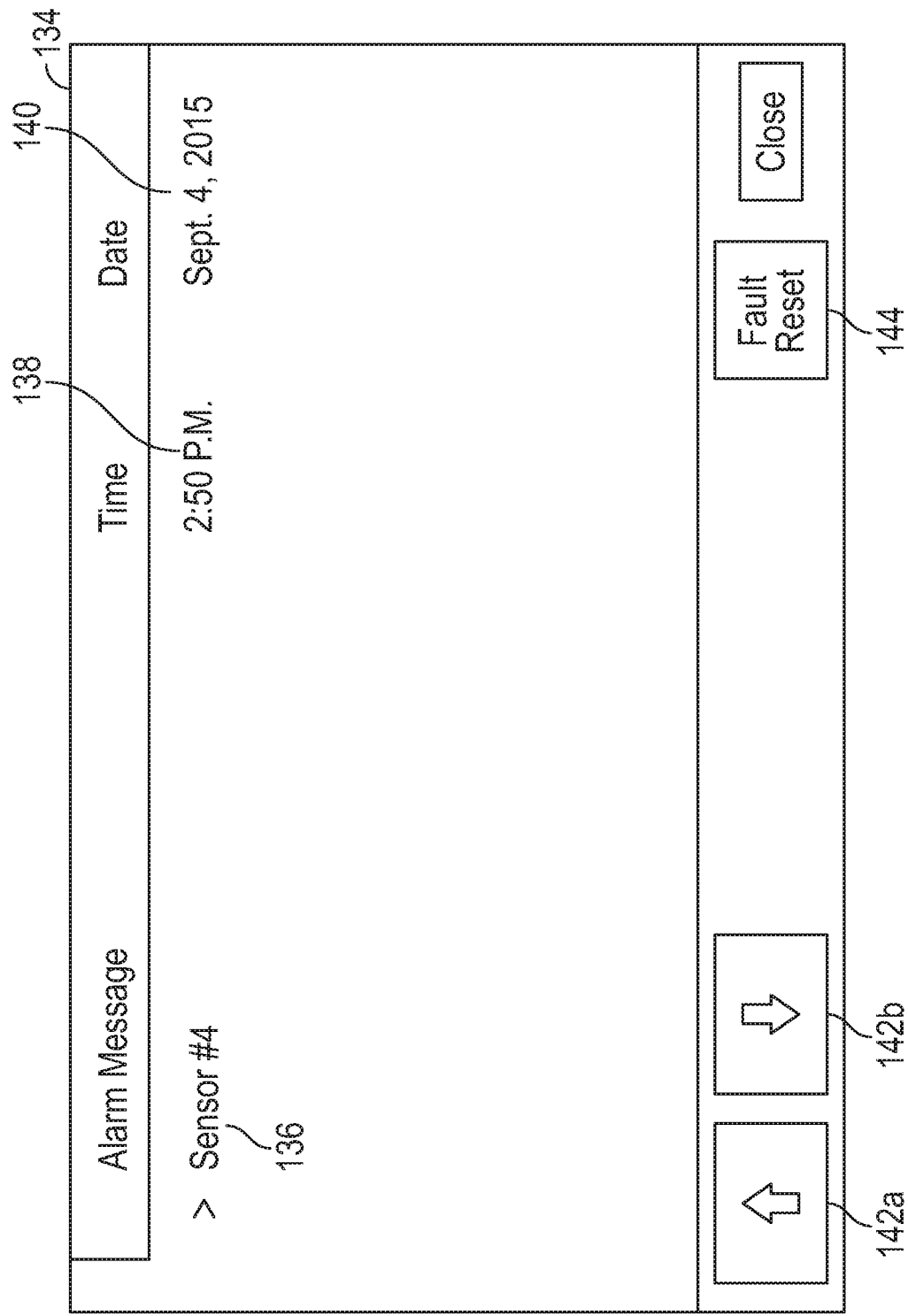
FIG. 8 is a schematic view of an alarm message display of an interface unit of the temperature control system of FIG. 3.

Referring now to FIG. 8, the interface unit 58 can be configured to display alarm messages, as shown by alarm message display 134. The alarm message display 134 is configured to provide alarm messages to signal if there is a problem with one of the pre-fan bank temperature zones 64a-64c, post-fan bank temperature zones 70a-70c, or a problem with the fan module 56. In the event of an alarm, an indicator can flash and/or alarm messages 136 can appear on the alarm message display 134. The alarm message 136 can include the time 138 and date 140 of the apparent problem. A plurality of direction buttons 142a, 142b allow scrolling through the messages. A fault reset button 144 initiates resetting of the messages.

Used in the manner described above, the temperature control system 50 adjusts the rotational speed of a plurality of cooling fans 24 such as to adjust the temperature of the pre-fan bank glass product 59 exiting the annealing lehr 16, thereby achieving a temperature of the cooled glass product 65 suitable for effective application of the lubricant.

The temperature control system 50 provides several benefits, although all benefits may not be available in all embodiments. First, the temperature control system 50 prevents the cooled glass product from being too hot as the lubricant is being applied, thereby eliminating the occurrence of the lubricant evaporation. Second, the temperature control system 50 prevents the cooled glass product from being too cool as the lubricant is being applied, thereby eliminating the occurrence of the lubricant forming spots on the surface of the glass product. Third, temperature control system 50 provides an automatic monitoring and adjusting of the temperature of the outer surface of the cooled glass product, thereby minimizing costly labor to accomplish the same. Finally, the temperature control system 50 substantially eliminates scrap glass product produced from improper lubricant temperature issues.

The principle and mode of operation of the temperature control system have been described in certain embodiments. However, it should be noted that the temperature control system may be practiced otherwise than as specifically illustrated and described without departing from its scope.

What is claimed is:

1. A temperature control system fitted to a glass product forming system for forming glass product, the glass product forming system including an annealing lehr configured for annealing still hot glass product, the temperature control system comprising:
   a first plurality of temperature sensors configured to sense a temperature of an outer surface of glass products exiting the annealing lehr and prior to a cooling fan bank, the first plurality of temperature sensors further configured to generate sensed temperature signals;
   a second plurality of temperature sensors positioned downstream from an exit to the cooling fan bank and configured to sense a temperature of an outer surface of glass products exiting the cooling fan bank, the cooling fan bank positioned downstream from the annealing lehr, the second plurality of temperature sensors further configured to generate sensed temperature signals; and
   a control module in electrical communication with the first plurality of temperature sensors and the second plurality of temperature sensors, the control module configured to receive the sensed temperature signals from the first and second plurality of temperature sensors and compare the sensed temperature signals with pre-set parameters, the control module further configured to direct adjustments in a rotational speed of a plurality of cooling fans in the cooling fan bank in response to the sensed temperature signals.

2. The temperature control system of claim 1, wherein each of the first plurality of temperature sensors is configured to sense a temperature of an outer surface of glass products in a separate pre-fan bank zone.

3. The temperature control system of claim 1, wherein each of the first plurality of temperature sensors is an infrared style of sensor configured to generate and provide 4.0-20.0 mA, 0-10 VDC signals.

4. The temperature control system of claim 1, wherein the control module is electrically connected to a fan module and configured to direct adjustments in a rotational speed of a plurality of cooling fans to the fan module in response to the sensed temperature signals.

5. The temperature control system of claim 4, wherein the fan module includes a variable frequency drive (VFD) module configured to control the rotational speed and torque of the plurality of cooling fans by varying motor input frequency and voltage.

6. The temperature control system of claim 5, wherein the control module is configured to store the pre-set parameters.

7. The temperature control system of claim 4, wherein the control module has the form of a programmable logic computer (PLC).

8. The temperature control system of claim 1, wherein the control module includes an interface unit.

9. The temperature control system of claim 8, wherein the interface unit is configured to display sensed temperature signals in real time.

10. The temperature control system of claim 8, wherein the interface unit is configured to display alarm messages in real time.

11. The temperature control system of claim 1, wherein each of the second plurality of temperature sensors is configured to sense a temperature of an outer surface of glass products in a separate post-fan bank zone.

12. The temperature control system of claim 1, wherein each of the second plurality of temperature sensors is an infrared style of sensor configured to generate and provide 4.0-20.0 mA, 0-10 VDC signals.

* * * * *